United States Patent [19]

Kruschik

[11] 4,284,098
[45] Aug. 18, 1981

[54] VALVES FOR CONTROLLING OR PREVENTING FLUID FLOW

[75] Inventor: Julius Kruschik, Gumpoldskirchen, Austria

[73] Assignee: Klinger AG, Zug, Switzerland

[21] Appl. No.: 9,838

[22] Filed: Feb. 6, 1979

[51] Int. Cl.³ .......................................... F16K 31/128
[52] U.S. Cl. .................................... 137/219; 251/14; 251/61.2
[58] Field of Search .................. 137/219; 251/14, 61.2

[56] References Cited

FOREIGN PATENT DOCUMENTS

| | | |
|---|---|---|
| 223894 | 10/1962 | Austria . |
| 1707886 | 9/1955 | Fed. Rep. of Germany . |
| 7231278 | 10/1975 | Fed. Rep. of Germany . |
| 1002879 | 9/1965 | United Kingdom . |
| 1005562 | 9/1965 | United Kingdom . |
| 1038487 | 8/1966 | United Kingdom . |
| 1105629 | 3/1968 | United Kingdom . |
| 1286811 | 8/1972 | United Kingdom . |
| 1343946 | 1/1974 | United Kingdom . |

*Primary Examiner*—Gerald A. Michalsky
*Attorney, Agent, or Firm*—Haseltine and Lake

[57] ABSTRACT

A valve for controlling or preventing fluid flow has a shut-off element controllably movable in an axial direction between a first position corresponding to a fully open condition of the valve and a second position corresponding to a fully closed condition of the valve,
a valve seat with which the shut-off element is capable of fluid-tight sealing engagement when in the said second position,
drive means operatively connected to the shut-off element and capable of controllably transmitting a drive to the shut-off element to effect the said controlled movement thereof towards one of either of the said first and second positions thereof,
said drive means including a connecting member transmitting the drive to the shut-off element, the shut-off element moving relatively to said connecting member in said axial direction when driven by said drive means, and furthermore being moved axially when said connecting member is moved axially,
a housing defining a chamber,
a diaphragm within said chamber and having a central region attached to said connecting member and a peripheral region attached to said housing, whereby the diaphragm supports said connecting member and is capable of moving said connecting member, and thereby also said shut-off element in the axial direction in response to pressure differences across the diaphragm, and
control means capable of controlling the said pressure differences across the diaphragm and operable, when the said drive means is operative and when the said drive means is inoperative, to control the said movement of the diaphragm. The pressure difference is so controllable that (1) at least when the said drive means is operative, the diaphragm is urged away from the valve seat, and (2) at least when the said drive means is inoperative, the diaphragm is urged towards the valve seat.

16 Claims, 2 Drawing Figures

VALVES FOR CONTROLLING OR PREVENTING FLUID FLOW

BACKGROUND OF THE INVENTION (1) Field of the Invention

The invention relates to a valve for controlling or preventing flow of a flowing medium.

(2) Description of the Prior Art

German Utility Model 72 31 278 describes a known such valve including means for controllably adjusting the separation between a housing seat and a movable shut-off element, full closure of the valve by the shut-off element being effected by a separate diaphragm drive being superimposable on the control motion.

However, when such known valves have large dimensions and are to be employed to control the flow of high temperature fluids, the diaphragms need to be made extraordinarily large in order to withstand the high loads occuring. Particularly at temperatures which call for the use of a metallic diaphragm the deformation of the diaphragm must still only be minimal.

SUMMARY OF THE INVENTION

An object of the invention is to provide a valve for control or prevention of fluid flow which is suitable for large nominal sizes at high operational temperatures.

Another object is to solve this problem by providing a valve which in operation requires only a small movement of the diaphragm.

A valve of the invention is based on valves of the type mentioned initially and is characterized in that the diaphragm drive is interposed into the force flow between a housing of the valve which accepts the shutting and control forces and the shut-off element and that the diaphragm can be subjected to force by a pressure medium from the one side during the control movement, and from the other side for superposing the shutting movement.

Thus a valve of the invention has a shutoff element controllably movable in an axial direction between a first position corresponding to a fully open condition of the valve and a second position corresponding to a fully closed condition of the valve, a valve seat with which the shut-off element is capable of fluid-tight sealing engagement when in the said second position, drive means operatively connected to the shut-off element and capable of controllably transmitting a drive to the shut-off element to effect the said controlled movement thereof towards one of either of the said first and second positions thereof, said drive means including a connecting member transmitting the drive to the shut-off element, the shut-off element moving relatively to said connecting member in said axial direction when driven by said drive means, and furthermore being moved axially when said connecting member is moved axially, a housing defining a chamber, a diaphragm within said chamber and having a central region attached to said connecting member and a peripheral region attached to said housing whereby the diaphragm supports said connecting member and is capable of moving said connecting member, and thereby also said shut-off element in the axial direction in response to pressure differences across the diaphragm, and control means capable of controlling the said pressure differences across the diaphragm and operable, when the said drive means is operative and when the said drive means in inoperative, to control the said movement of the diaphragm.

The pressure difference is so controllable that (1) at least when the said drive means is operative, the diaphragm is urged away from the valve seat, and (2) at least when the said drive means is inoperative, the diaphragm is urged towards the valve seat.

In contrast to the known control valves of this type therefore, the drive means for effecting the controlled axial movement of the shut-off element and the control means for controlling the movement of the diaphragm are not arranged in parallel but in series. This means that operation of the drive means can take place practically over the whole stroke without diaphragm movement (deformation). At each position of the shut-off element and particularly just before it reaches the position corresponding to the fully closed condition, the diaphragm can move the shut-off element in the direction of the valve seat or in the opposite direction. During this the diaphragm control means generates the required large shutting forces with little travel of the diaphragm. A division of the manner in which the operating forces are applied has been achieved, therefore, a controlled drive means being provided for achieving large controlled axial movements of the shut-off element between the positions corresponding to the open and closed conditions of the valve with small actuating forces and a diaphragm control means for achieving large shutting forces with small movement of the diaphragm and shut-off element. Such a construction makes it possible to combine a controlled drive means with a diaphragm control means for valves with large nominal widths at high operating temperatures, this being because the diaphragm in a valve embodying the invention has to travel only relatively short distances.

The controlled drive means can be arranged in different ways such as, for example, directly on the diaphragm, but it is provided advantageously outside of the valve housing and is linked with the shut-off element via force transmission elements passing through the center of the diaphragm. In an even more advantageous embodiment, the controlled drive means is firmly connected with the valve housing, a rotating shaft passing through the diaphragm being provided which, in order to provide an axial control movement for the shut-off element, is coupled to the latter via crossed helical gears.

A valve embodying the invention which, due to its axial symmetry for large nominal widths and high temperatures is particularly advantageous, results if the shut-off element is accommodated in an inner housing axially symmetrical with respect to a tubular outer housing and containing the diaphragm control means and connected with the outer housing via rib-like supports supporting both feeder lines for a pressure medium of the diaphragm control means (for controlling the diaphragm during full closure) and elements for the transmission of forces between the controlled drive means (for axial displacement of the shut-off element) attached at the outer housing and shut-off element.

DESCRIPTION OF PREFERRED EMBODIMENTS

Figure 1:
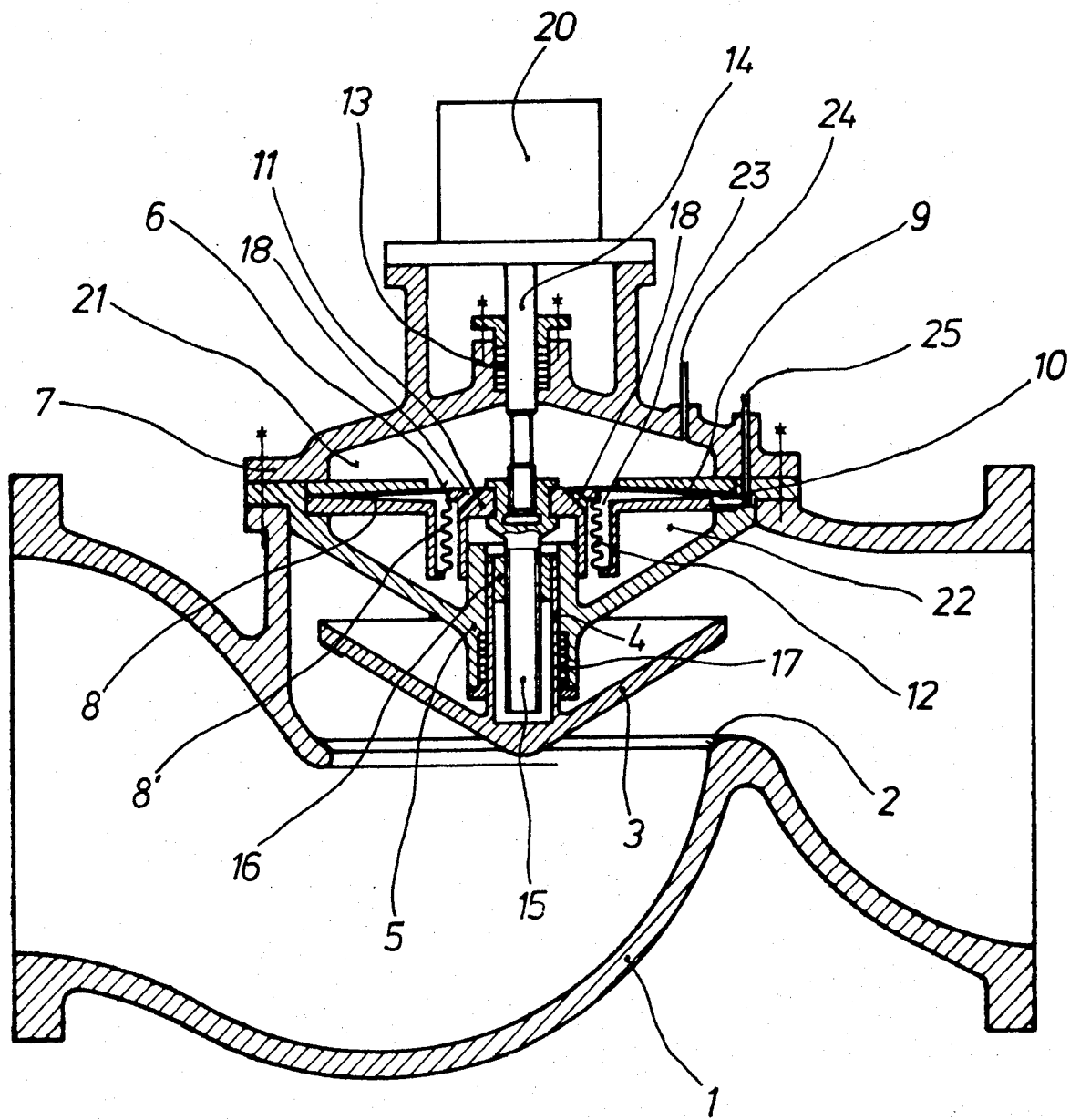
FIG. 1 shows an axial section of one embodiment of the invention.

FIG. 1 shows a valve equipped with a valve seat 2 arranged in a housing 1 and acting in conjunction with a shut-off element 3 which is movable vertically with respect to the main valve axis. This shut-off element 3 has a cylindrical neck 4 extending upwardly into a recess provided in a bottom, support, lid 5 extending over the whole opening in the housing and resting on the edge of this opening in the housing. In addition, a diaphragm 6 is attached to the edge of the opening and extends over the whole opening in the housing and together with other parts to be described defines spaces 21, 22, 23 to which pressure can be applied for movement of the diaphragm.

A top lid 7 of the housing, a lower support part 8, an upper support ring 9 (each for supporting the diaphragm 6) and the support lid 5 are all screwed to the edge of the opening in the housing while being sealed off with respect to each other. The diaphragm 6 has at its center a guide part 11 which is displaceable along an upwardly facing projection of the support lid, a bellows 12 being provided between one tubular end 8' of the lower support part 8 and the outer edge of the guide part 11 so that the space 23 between the diaphragm 6 and the support part 8 is sealed with respect to the guide part 11 and can be subjected to fluid pressure by a control fluid which can be fed in via a duct 10 provided in the top lid 7 of the housing 1, bottom, support, lid 5 and lower support part 8, the diaphragm 6 then being supported by the upper support ring 9. The guide part 11 is carried by a connecting member at an upper axial end of a screw spindle 15 forming part of a drive means for providing axial displacement of the shut-off element 3. The drive means further includes a rotatable control drive 20 mounted on the top lid 7 of the housing which control drive 20 is operatively connected to the connecting member at the upper axial end of the screw spindle 15 by means of a drive shaft 14 passing through the top lid 7 of the housing and held in a packing box 13. The connecting member is rotatable with the drive shaft 14 but is movable axially relative thereto. The screw spindle 15 is operatively connected to the shut-off element 3 via a nut 16 disposed within the shoulder 4 of the shut-off element 3. The operative connection is such that rotational drive of the screw spindle 15, causes axial movement of the shut-off element 3. A packing gland 17 is provided between the cylindrical neck 4 of the shut-off element 3 and the bottom, support, lid 5. During the controlled axial displacement of the shut-off element by the drive means, the diaphragm is maintained in the position shown in FIG. 1, namely in abutment with the upper support ring 9. Thus during the axial displacement the fluid pressure applied to space 23 is sufficiently greater than that supplied to space 21 that the pressure difference causes the diaphragm to be maintained in this uppermost position. Preferably, the shut-off element 3 is not itself subjected to a pressure gradient while axial displacement thereof by the drive means is in progress. In order that this be possible the space 21 limited by the top lid 7 of the housing is connected with the space 22 limited by the bottom, support, lid 5 of the housing via a drilling 18 in the guide part 11. Thus, since the pressure inside these spaces is allowed to agree with the pressure of the medium flowing through the valve, the shut-off element is not subject to a pressure gradient. When the valve is to be fully closed, the spaces 21 and 22 connected by means of drilling 18 are placed under pressure via the line 24 and the pressure in the space 23 between support part 8 and diaphragm 6 is reduced by withdrawal of fluid via the line 25. During this compression of the diaphragm by fluid in the spaces 21 and 22 the closing forces, large in comparison to the axial displacement drive forces, can be generated simply and with savings in space.

Thus, as can be seen from the above description of the valve, controlled axial displacement can be achieved with the relatively low forces needed to achieve this axial displacement, whereas when efficient full closure of the valve is required, high forces can be generated by the fluid pressure to achieve a good fluid-tight seal, these forces being unchanged irrespective of any heat expansion.

Figure 2:
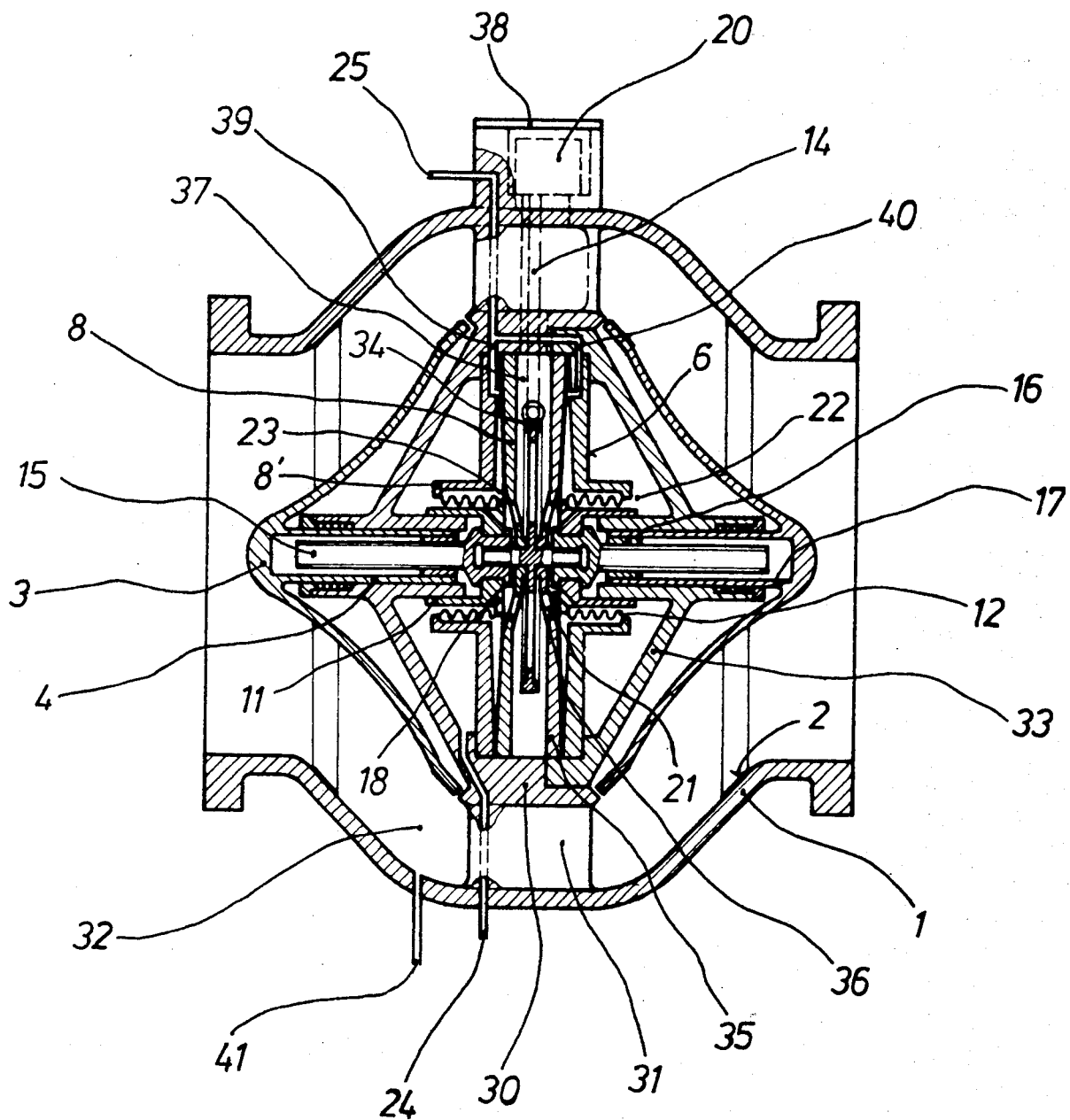
FIG. 2 shows an axial section of a second embodiment of the invention which takes the form of a valve having shut-off elements movable axially of a flow line.

FIG. 2 shows a second valve embodying the invention and constructed in the form of a so-called axial valve, which has a tubular outer body defining a housing 1 in which an inner body defining a housing 30 is provided axially symmetrically. The inner body 30 is linked to the outer housing 1 via rib-like supports 31 and accomodates two shut-off elements 3 which can control a fluid medium flowing through the valves by changing the axial spacing with respect to valve seats 2 disposed on the inner wall of the outer housing 1. Respective peripheral regions of the shut-off elements 3 co-operate with the respective seats 2 while being subjected to mutual pressures in order to achieve complete closure. In the closed condition the space 32 can be subjected to fluid pressure via line 41 with a blocking medium between the two shut-off elements 3 resting against the seats 2, guaranteeing a particularly tight closure. In contrast to the valve according to FIG. 1 the shut-off elements 3 with their shoulders 4 running in the direction of the axis are not supported in a support lid covering the opening in the housing, but in conical supports 33 which are firmly joined to the inner body 30. The diaphragm drive is mounted in the inner body 30 and works just like the screw drive generating the controlled axial movement as in the embodiment described with reference to FIG. 1; it is also constructed in the same manner. The same parts occurring in both drawings carry the same reference numbers. The feeder lines 24, 25 for the fluid for supplying pressure to the diaphragm for achieving the movement thereof for full closure of the valve and also the drive shaft 14 for force transmission from the control drive 20 (which drive 20 is attracted to an external wall of the outer tubular body 1) run into the housing defined by the inner body 30 and each run through the supports 31 supporting the inner housing. The line 24 for the fluid for generating pressure is connected with the space 22 limited by the conical support 33 and via drillings 18 in the guide part 11 with the space 21 between diaphragm 6 and support disk 35. This is provided with drillings 36 and the pressure space 21 is also connected with the space 37 containing the drive shaft 14 and the control drive itself and hence the housing 38 containing the control drive 20 must be so constructed as to be pressure-tight. Another line 25 is connected via ducts 39 in the inner housing 30 and in the support part 8, as well as via ducts 40 in a conical support, with the space 23 between diaphragm 6 and support part 8. This space is subjected to pressure when axial displacement of the shut-off element by the drive means is to occur. For control of the axial movement, drive is transmitted from control drive 20 via the drive shaft 14 and via a worm gear 34 supported in the inner housing to the two screw spindles which then, as described in connection with the example according to FIG. 1, effect movement of the shut-off element 3. In this case, too, it is guaranteed that, on the one hand, the required shutting forces can be generated simply and without undue deformation of the diaphragm and that, on the other hand, a small controlled axial displacement drive can be used, which is particularly significant in this type of construction where all the drive forces must be introduced into the inner housing via the supports.

We claim:

1. A valve for controlling fluid flow, which valve comprises:
   a shut-off element displaceable in an axial direction between a first position corresponding to an open condition of the valve and a second position corresponding to a closed condition of the valve.
   a valve seat with which the shut-off element is capable of fluid-tight sealing engagement when in the said second position,
   drive means operatively connected to the shut-off element and capable of transmitting a drive to the shut-off element to effect the said displacement thereof between the said first and second positions thereof,
   a connecting member capable of transmitting the drive to the shutoff element, the shut-off element being arranged to move in said axial direction (i) relatively to said connecting member when driven by said drive means, and, (ii) with said connecting member when said connecting member is moved axially,
   a housing defining a chamber,
   a diaphragm within said chamber and having a central region attached to said connecting member and a peripheral region attached to said housing, the diaphragm supporting said connecting member, and being controllable independently of the drive means, so as to move said connecting member, and thereby provide said displacement of the shut-off element with the connecting member in response to pressure difference across the diaphragm, and
   diaphragm control means capable of controlling the said pressure differences across the diaphragm and operable to control the said movement of the diaphragm,
   the action of the diaphragm on the connecting element being superimposable on the transmission by the connecting element of the drive from the drive means to the shut-off element in such a manner that when the drive means acts to displace the shutoff element, the diaphragm is not constrained to suffer a corresponding displacement equal to that of the shutoff element, and
   the said pressure difference being so controllable that
   (1) at least when the said drive means is operative to drive the shutoff element between the first and second positions, the diaphragm is urged by the said pressure difference away from the valve seat, and
   (2) at least when the said drive means is inoperative and the shut-off element is at the second position, the diaphragm is urged by the said pressure difference towards the valve seat to move the shut-off element into sealing engagement with the valve seat.

2. A valve according to claim 1 wherein the diaphragm control means comprises means for controlling admission of fluid to either side of the diaphragm.

3. A valve according to claim 1 wherein the drive means comprises rotary drive means causing axial displacement of the shut-off element relative to the connecting member when driven by said rotary drive means.

4. A valve according to claim 3 wherein the rotary drive means comprises a rotatable shaft passing through the diaphragm.

5. A valve according to claim 3 wherein the rotary drive means includes crossed helical gears coupling the rotatable shaft to the shut-off element to effect the said axial movement thereof during transmission of rotary drive.

6. A valve according to claim 1 wherein the housing is an outer housing defined by a generally tubular outer body having an inner wall at which the valve seat is located and a central longitudinal axis, the valve further including an inner body disposed symmetrically with respect to the central longitudinal axis of the tubular outer body, the shut-off element being carried by the inner body and displaceable away from it for sealing engagement with the valve seat at the inner wall of the outer body, the said inner body defining an inner housing containing the diaphragm, rib supports connecting the inner body to the tubular outer body, the diaphragm control means including pressure fluid supply lines, carried by the rib supports, for controlling the pressure difference across the diaphragm.

7. A valve according to claim 6 wherein the inner body carries two said shut-off elements and defines two respective inner housings containing respective diaphragms.

8. In a valve for controlling fluid flow, including means for controlling the motion of an axially movable shut-off element and thereby the axial separation between a housing seat and said axially movable shut-off element, axial shutting motion of the shut-off element being effected by a separate diaphragm drive superposable on the control motion, the improvement that the diaphragm drive is interposed between the shut-off element and a housing of the valve which accepts forces of the shutting motion and of the control motion and that the diaphragm can be subjected to force by a pressure medium from its one side during the control motion, and from its other side for superposing the shutting motion.

9. In a valve for control of fluid flow having a shut-off element axially movable to close against a valve seat, drive means to cause axial movement of said shut-off element, and a diaphragm operatively connected to said shut-off element so as to apply axial force to said shut-off element in the closing direction in response to fluid pressure, the improvement comprising arranging the diaphragm to control the axial position of a connecting member forming part of said drive means, the shut-off element being axially movable relative to said connecting member by the drive means, control fluid being admissible to volumes on both sides of diaphragm.

10. A valve controlling fluid flow comprising
   a valve seat,
   a shut-off element movable relative to the valve seat between a first position corresponding to an open condition of the valve and a second position corresponding to a closed condition of the valve in which the shut-off element is in fluid tight engagement with the valve seat, a drive means and a diaphragm, each operatively connected to the shut-off element, and diaphragm control means for controlling pressure difference across the diaphragm, wherein:

the drive means acts so as to move the shut-off element between the said first and second positions, the diaphragm is controllable, in response to the said pressure difference across the diaphragm, so as to urge shut-off element against the valve seat when the shut-off element is at the second position and the action of the diaphragm on the shut-off element is superimposable on the action of the drive means on the shut-off element in such a manner that, when the drive means acts to displace the shut-off element, the diaphragm is not constrained to suffer a corresponding displacement equal to that of the shut-off element.

11. A valve according to claim 10, which additionally comprises a diaphragm support capable of retaining the diaphragm in fixed relation to the valve seat and wherein the said pressure difference is controllable
(a) during movement of the shut-off element by the drive means between the said first and second positions, to urge the diaphragm away from the valve seat and against the diaphragm support so that the diaphragm is in fixed relation to the valve seat, and
(b) when the shut-off element is at the second position to urge the diaphragm away from the diaphragm support and towards the valve seat to effect the said fluid tight engagement to the shut-off element with the valve seat.

12. A valve according to claim 10, which additionally comprises a connecting member connecting each of the drive means and diaphragm to the shut-off element, the connecting member being capable of transmitting drive from the drive means to the shut-off element and being movable with the diaphragm to transmit movement of the diaphragm to the shut-off element.

13. A valve according to claim 10, which additionally comprises a housing and coupling means operatively connecting the drive means to the shut-off element, the diaphragm and the shut-off element being disposed within the housing, the drive means being disposed outside the housing and the coupling means extending between the drive means outside the housing and shut-off element within the housing and passing through the diaphragm.

14. A valve according to claim 13, wherein the coupling means comprises a rotatable shaft passing through the diaphragm and a screw drive capable of translating the rotational movement of the shaft into the said movement of the shut-off element relative to the valve seat.

15. A valve according to claim 13, wherein the housing is an outer housing defined by a generally tubular outer body having an inner wall at which the valve seat is located and a central longitudinal axis, the valve further including, an inner body disposed symmetrically with respect to the central longitudinal axis of the tubular outer body, and rib supports connecting the inner body to the tubular outer body, the means for controlling the pressure difference across the diaphragm including pressure fluid supply lines carried by the rib supports, the shut-off element being carried by the inner body and movable away from it for sealing engagement with the valve seat at the inner wall of the tubular outer body, and the inner body defining an inner housing containing the diaphragm.

16. A valve according to claim 15, wherein the inner body carries two shut-off elements and the housing defined by the inner body contains two said diaphragms for moving the respective shut-off elements.

* * * * *